Feb. 12, 1952   P. R. JOHNSON   2,585,469
PROCESS FOR THE MANUFACTURE OF CHLOROMETHANES
Filed May 20, 1948
FIG. I.
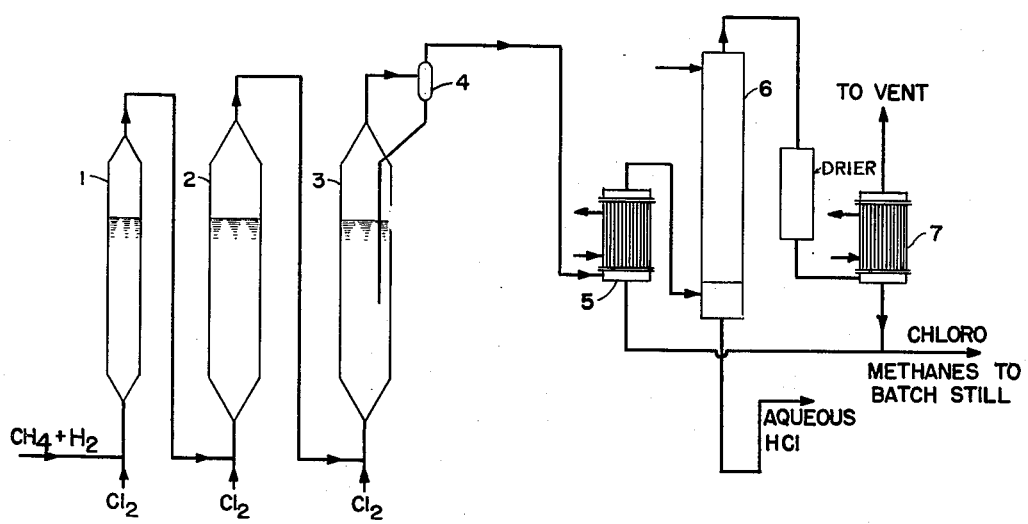
FIG. 2.
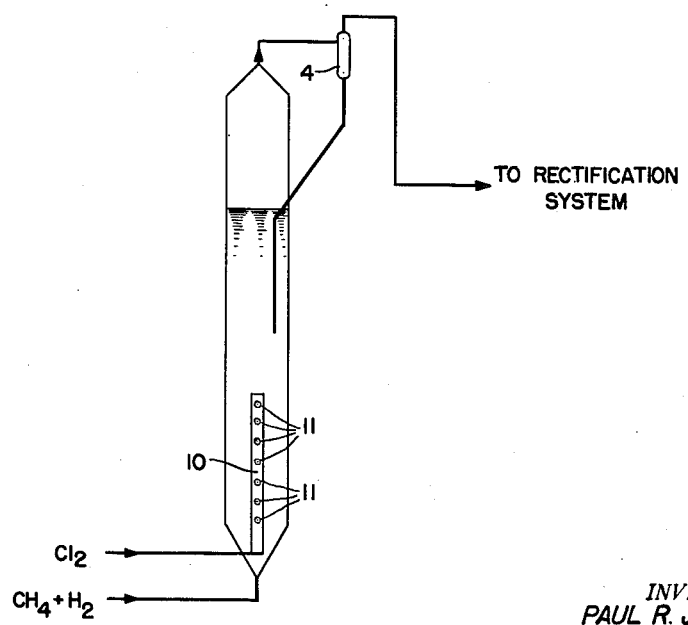
INVENTOR.
PAUL R. JOHNSON
BY
ATTORNEY Patented Feb. 12, 1952

2,585,469

UNITED STATES PATENT OFFICE 2,585,469

PROCESS FOR THE MANUFACTURE OF CHLOROMETHANES

Paul R. Johnson, Claymont, Del., assignor to E. I. du Pont de Nemours & Company, Wilmington, Del., a corporation of Delaware Application May 20, 1948, Serial No. 28,069

5 Claims. (Cl. 260—662)

This invention relates to an improved process for the manufacture of chloromethanes and hydrogen chloride by a vapor phase reaction of a mixture of methane and hydrogen with chlorine.

In the vapor phase chlorination of hydrocarbons, the reaction of the chlorine and the hydrocarbons has been carried out in the presence or absence of catalysts and in the presence or absence of light and over a relatively wide range of temperatures, ordinarily from 300° to 500° C. Since these reactions are highly exothermic, one of the chief problems involved has been to control the temperatures of the reactions, for, if not adequately controlled, carbon is formed and undesirable condensation products are produced.

Various methods have been described for controlling the temperature of these chlorination reactions, such as by pre-mixing methane and chlorine in the cold and introducing this mixture into a stream of methane at reaction temperatures, or by causing the reacting gases to pass between closely positioned surfaces so that adequate heat transfer can be effected. Still further methods use high gas velocity or incremental additions of chlorine in an attempt to control the reaction temperatures, while other processes are described wherein a diluent gas is added to the reaction mixture. Special methods for cooling the wall of the apparatus or for causing the gas stream to move at a velocity greater than that of flame propagation have been described. The use of static beds of inert solids through which the gases are passed has also been employed to control the temperature.

In British Patent 513,947 the vapor phase catalytic halogenation of hydrocarbons, and specifically the chlorination of methane, is carried out by passing the gases through a turbulent bed ("fluidized" or "boiling") of the catalyst or of inert materials upon which the catalyst has been deposited. The advantage of using such a boiling bed or fluidized solid to control the temperatures of highly exothermic or endothermic reactions has also been described in the field of the catalytic hydrocarbon cracking and in the oxidation of various organic materials in the presence of catalysts. See British Patent 568,913.

In the chlorination of methane various side reactions are possible, including the formation of carbon, while in the formation of hydrogen chloride from its elements no undersirable side reactions can occur and control of the reaction temperature is necessary only to the extent required to protect the vessel in which the reaction takes place, and it is common practice to allow the reaction of hydrogen and chlorine to proceed as a flame reaction in burners of a suitable design.

The heat of reaction from the chlorination of methane is about 25,000 calories per mol of chlorine, whereas the heat of reaction of hydrogen and chlorine is about 45,000 per mol of chlorine. The heat of reaction for the chlorination of a mixture of methane and hydrogen will therefore be greater than the heat of the chlorination of methane alone. In the chlorination of mixtures of methane and hydrogen the chlorination of the methane must occur simultaneously with the chlorination of the hydrogen, and it is obvious that if adequate temperature control is difficult to achieve in the chlorination of methane alone, the control of the temperature of mixtures of methane and hydrogen would be still more difficult. These facts, combined with certain economic features, have apparently prevented the development of a process for chlorinating mixtures of methane and hydrogen, and the only example of the use of such a mixture that has been found is that described by Walter in German Patent 222,919 wherein it is pointed out that the presence of hydrogen in the chlorination of methane not only consumes chlorine unnecessarily, but also causes explosions. Walter preferred to remove substantially all of the hydrogen from his mixture before chlorinating the methane.

Large supplies of mixtures of methane and hydrogen are available as by-product gases from petroleum hydrocarbon cracking operations, and the calorific value of these gases is generally recovered by using them as fuel gas. There is a growing trend to locate chemical manufacturing plants in the vicinity of hydrocarbon cracking operations. These chemical plants present a considerable demand for hydrogen chloride, and it is therefore highly desirable that a commercial process for chlorinating mixtures of methane and hydrogen be provided which will supply the hydrogen chloride and simultaneously produce the valuable chloromethanes such as carbon tetrachloride, chloroform, etc., from this source of cheap raw material.

It is therefore an object of this invention to provide a process for chlorinating mixtures of methane and hydrogen simultaneously. It is a further object of the invention to provide a commercially feasible process for chlorinating mixtures of methane and hydrogen and for controlling the temperature of such reaction so that the formation of carbon and undesired condensation products is held at a minimum. Further objects will be apparent from the following description.

It has now been found that mixtures of methane containing from 20% to 60% hydrogen by volume can be chlorinated to hydrogen chloride and chloromethanes by causing the methane-hydrogen mixture to react with chlorine in the presence of a turbulent bed of finely divided inert solid at temperatures of from 300° to 450° C. Where it is desired to produce chloromethanes in which predominant quantities of chloroform and carbon tetrachloride are present, the quantities of chlorine employed must be those approaching the maximum stoichiometric amounts. However, the operating principles of this process are not limited to this upper range of feed ratios. In the chlorination of pure methane the maximum amount of chlorine which can be theoretically utilized is 4 mols per mol of methane, while in the chlorination of methane-hydrogen mixtures the maximum chlorine which can be utilized decreases from 4 mols to 1 mol per mol of feed gas as the hydrogen concentration in the methane increases from 0 to 100%. In chlorinating a methane-hydrogen mixture containing 40% hydrogen the maximum theoretical amount of chlorine which can be utilized is 2.8 mols per mol of feed gas.

When using a mixture of 60% methane–40% hydrogen and in order to produce predominantly $CHCl_3$ and $CCl_4$, it is theoretically necessary to use from 2.0 to 2.8 mols of chlorine per mol of feed gas, and, for reasons hereinafter explained, it is necessary to add the chlorine in at least three portions. In the chlorination of methane and hydrogen, if the initial concentration of chlorine in the gas stream is, by volume, from 40% to 50% at about 350° C., it has now been found that the initial rate of heat release is about 8 kilo calories per second per mol. At 370° C. it is 13 kilo calories per mol. This is greater than the capacity of the turbulent sand bed to dissipate the heat, and actual ignition will occur unless a lower chlorine concentration is used.

According to the present invention the addition of chlorine to the gas stream in portions may be carried out in various types of equipment. Preferred types of reactor systems are illustrated in the accompanying drawing which forms a part of this application and in which Figure 1 is a diagrammatic view of one form of reactor system, together with the rectifying system, and Figure 2 shows a modified type of reactor which may be substituted for the 3 reactor system in the set-up of Figure 1.

The system of Figure 1 consists of three vertical reactor tubes (1, 2 and 3) which may be from 7 to 20 or more feet tall and not less than 2 inches in diameter. These tubes contain fine silica sand (200 to 325 mesh) to provide a sand bed having a depth of from 4 to 15 feet. In operation of the system the sand is maintained in a fluidized state by the upward flow of the gaseous reactants or products through the tubes. The three reactor tubes are connected in series by suitable pipe lines. The methane-hydrogen mixture is mixed with a portion of the total chlorine at some temperature in the range of 25° to 200° C. and then introduced into the bottom of the first reactor tube directly or through a conventional gas distributor. The first reactor tube is preferably maintained at a temperature of 325° to 375° C., and sufficient gas is fed to the reactor to provide a gas velocity through the tube of between 0.2 and 1.0 foot per second (based on the empty tube), as more particularly illustrated in the following specific examples.

The product gases from the first tube are cooled to 100° to 200° C., mixed with a second portion of the total chlorine and then introduced into the second reactor tube. The product gases of the second tube are similarly cooled and mixed with the remaining portion of chlorine and allowed to react in the third tube. The second reactor tube is preferably maintained at a temperature of from 325° to 375° C., and the last tube is preferably maintained at any temperature in the range of from 350° to 425° C., which may be necessary to cause practically complete utilization of the chlorine. The diameter of the three tubes may differ in order to keep the gas velocity in each tube within the range of 0.2 to 1.0 foot per second.

The gases from the last reactor may be passed through a cyclone separator 4 or other device to remove a small amount of entrained solids and then passed to a cooling and rectification system. The rectification system may be based on any of the many methods apparent to one skilled in the art of separating such materials. For my purposes I have found it advantageous to partially condense the higher boiling chloromethanes in condenser 5, then scrub the hydrogen chloride out of the gas stream in scrubber 6 with warm water, and condense the remaining chloromethanes from the dried residual gas stream in condenser 7. The organic condensates from 5 and 7 are then combined and fractionated in batch stills.

The following examples are given to illustrate the invention in more details.

EXAMPLE 1

To a reactor system similar to that illustrated in Figure 1 of the drawing in which the diameter of the first tube was 2 inches and the second and third tubes each 3 inches, each tube being seven feet tall and containing a sand bed whose static height was 44 inches, was fed a methane-hydrogen stream containing 40.5% hydrogen at a rate of 370 liters per hour. Chlorine was fed to the three tubes at a rate of 215, 403 and 277 liters per hour, respectively. The temperature of the tubes was maintained at 350°, 360° and 413° C.

The product gas stream before condensation contained 1.3% of free chlorine and 83% of hydrogen chloride. The rate of production of hydrogen chloride was 1610 g. per hour. The rate of production of crude chloromethanes was 1142 g. per hour. The organic product contained 3.3% by weight of methylene chloride, 31.3% of chloroform, 63.6% of carbon tetrachloride and 1.8% of material boiling higher than carbon tetrachloride. The residual gas was 8.5% of the original methane-hydrogen feed. The carbon atom recovery in the organic products and residual gas was 99% of the original methane fed.

EXAMPLE 2

In the system described in Example 1 and with the same methane-hydrogen feed, the chlorine feed was adjusted to 209, 302 and 95 liters per hour to the respective tubes. In this case the hydrogen chloride production rate was 1275 g. per hour and the organic production rate 870 g. per hour. The organic product was 2.3% of methyl chloride, 9.8% of methylene chloride, 41.9% of chloroform, 45% of carbon tetrachloride and 1.0% high boilers. The residual gas was about 16% of the feed and contained approximately equal volumes of methane and hydrogen.

During the course of some 30 hours of intermittent operation under varying feed conditions, no flames were observed in the reactor system. The sand in tubes 1 and 2 retained its original grayish-white color, indicating no carbon had been deposited. In the third tube a slight darkening of the sand was observed.

In the chlorination process there is a maximum concentration of chlorine which can be tolerated in the reacting gases at any given point in the turbulent bed for a given bed temperature if the production of undesirable side reaction products is to be held at a minimum. When a methane-hydrogen mixture containing 40% hydrogen is mixed with chlorine, the following chlorine concentrations have been determined as substantially the maximum for each temperature given:

*Ignition threshold for chlorination of methane-hydrogen*

| Mol of $Cl_2$ in feed | Temp. of Sand Bed |
|---|---|
| Percent | °C. |
| 10 | 450 |
| 20 | 413 |
| 30 | 380 |
| 40 | 358 |
| 50 | 348 |

If these related conditions of temperature and concentration are exceeded, incipient pyrolysis and undue formation of carbon occurs. Still greater divergence from these values will lead to firing of the gases within the sand bed.

Where a number of turbulent bed reactors are used in series and where the chlorine is admixed with the methane and hydrogen in the absence of the inert solids the reactant gases must be introduced into the turbulent bed as soon as possible after mixing to prevent uncontrolled reactions in this section of the equipment. Calculations based on reaction rate data indicate that a methane-hydrogen-chlorine mixture containing 50% chlorine will, when mixed under adiabatic conditions at an initial temperature of 250° C., undergo uncontrollable reaction within five seconds. Mixtures containing 30%, 40% and 60% of chlorine will become uncontrollable in only slightly longer times. It is therefore desirable to mix the gases at a temperature below 200° C. and to limit the residence time between the mixing point and the entrance to the turbulent bed to less than five seconds. In order to obtain efficient mixing of the gases it is desirable to use gas velocities of the order of 20 feet per second or higher in this region of the equipment.

The above examples and description illustrate the essential features of the preferred method of operating the process of this invention. However, it may be economically desirable to sacrifice a portion of the excellent yields obtained by such operation and operate at higher temperatures and/or use a single reactor tube. I have found that this can be done by applying the principle of incremental addition of chlorine to a single reactor tube.

In carrying out the chlorination of methane and hydrogen in a single turbulent bed, the equipment illustrated in Figure 2 may be used. In this case the methane-hydrogen mixture is introduced into the bottom of the sand bed at such a rate that the initial gas velocity without chlorine (based on the empty tube) is of the order of 0.1 to 0.3 ft. per second. This gas may or may not be preheated. The chlorine is introduced through a vertical distributor pipe 10 within the sand bed. This pipe has a number of small holes 11 grouped at various levels at least two inches apart. The diameter of the holes is such that the gas velocity through each hole is of the order of 200 feet per second, or more. The number and spacing of the holes is such that the maximum possible chlorine concentration at any level is less than 40% of the total gas by volume, and preferably considerably lower than this value. The temperature of the sand bed may then be maintained in the range of 350°–450° C. The exact temperature will depend on the number and spacing of the chlorine distribution points, on the height of the sand bed and the amount of chlorine which can be tolerated in the product gas. The products of the reaction can of course be treated in the same manner as described for the three-tube reactor systems illustrated in Figure 1.

EXAMPLE 3

A reactor tube 3 inches in diameter and 7 feet in height was equipped with a chlorine distributor tube having 24 orifices arranged in groups of three around the tube at eight levels. The orifices were all 0.020 inch in diameter and the levels were spaced 2 inches apart. The reactor tube contained a 44 inch bed of sand which was maintained at 410° C. Methane, hydrogen and chlorine were fed to the reactor at rates of 113, 67 and 480 liters per hour, respectively.

Hydrogen chloride was produced at a rate of 810 g. per hour and crude chloromethanes were produced at a rate of 592 g. per hour. The residual gas was 11% of the volume of methane and hydrogen originally fed. The organic products consisted of 0.4% methylene chloride by weight, 11.9% chloroform, 83.2% carbon tetrachloride and 4.2% higher boiling material. The carbon atom recovery in the organic products and the residual gas was 96%.

EXAMPLE 4

A reactor tube similar to that of Example 3 was equipped with a chlorine distributor having nine .020 inch orifices arranged with 3 at each of three levels and four .038 inch orifices at a fourth upper level. The orifice levels were 2 inches apart. With a gas feed equivalent to that of Example 3 and a bed temperature of 410° C., this reactor produced an organic product containing 10% by weight of material boiling higher than carbon tetrachloride.

EXAMPLE 5

A reactor tube 6 inches in diameter and 20 feet high was equipped with a vertical chlorine distributor having thirty 0.020 inch orifices arranged in groups of three about the distributor at ten levels each 4 inches apart, and twelve 0.038 inch orifices arranged in groups of three about the distributor at four levels located at 4, 10, 18 and 28 inches above the uppermost level of the smaller orifices. The reactor tube was filled with sand to a depth of 10 feet. The sand bed was maintained at a temperature of about 423° C. A 40% mixture of hydrogen in methane was fed to the reactor at a rate of 66 cu. ft. per hour. The chlorine feed to the reactor was 174 cu. ft. per hour.

Under these conditions hydrogen chloride was produced at a rate of 18.9 lbs. per hour, and crude chloromethanes were produced at a rate of 11.7 lbs. per hour. The residual gas was about 5% of initial methane-hydrogen feed. The organic products consisted of 1.4% of methylene chloride by weight, 24.6% of chloroform, 66.4% of carbon tetrachloride and 7.6% high boilers.

In general, in the operation of the single tube reactor carbon formation occurred to some extent, so that the turbulent sand bed became black after a few hours of operation. However, the carbon content of the sand was never greater than about 1% by weight even after prolonged operation. The deposition of carbon did not impair the trouble-free course of the reaction nor did it have any influence upon the resulting products.

It has been noted that in the operation of the single tube reactor new sand had a far greater tendency to cause ignition than sand which had been used for some time. It has also been found that if the unused sand was treated with an equal volume of from 5% to 37% aqueous hydrochloric acid, a marked reduction in tendency to ignite the reaction gases was obtained. This treatment of the sand also surprisingly reduced the production of high boilers, as is shown in the following example.

EXAMPLE 6

The reactor tube described in Example 3 was filled with sand which had not been previously used, and then operated at a chlorine-to-methane plus hydrogen feed ratio of 2.26 to 1. Under these conditions the reactor produced an organic product which contained 12.7% by weight of materials boiling higher than carbon tetrachloride.

A sufficient quantity of fresh sand necessary to fill the reaction tube described in Example 3 was suspended in 20% aqueous hydrochloric acid and stirred over a period of several hours. After standing 24 hours, the acid was filtered off and the sand was washed with water until the washings were free of acid. The sand was then dried and placed in the reactor tube.

The reactor was now operated at a chlorine-to-methane plus hydrogen feed ratio of 2.43 to 1. Under these conditions the reactor produced an organic product which contained only 3.6% high boilers.

The use of acid-washed sand has further advantages which are not immediately apparent. In initial operation of the reactor, impurities in the sand or the product of these impurities with chlorine are volatilized out of the turbulent bed and tend to condense and solidify on the upper walls of the reactor tube and in the exit line. Plugging of lines due to these materials has caused considerable operating difficulties in the initial stages of operation. The use of acid-washed sand eliminates these operating difficulties.

As pointed out above, the control of the temperature in the chlorination of methane and hydrogen mixtures presents a much greater problem than the control of the temperatures in the chlorination of methane or other hydrocarbons alone, and none of the methods heretofore employed, when operated as disclosed in the prior art for control of the temperatures in the chlorination of methane, have been found suitable for controlling the temperatures in the chlorination of methane-hydrogen mixtures, particularly where the chlorination of the methane in the mixture is carried to a point were principally chloroform and carbon tetrachloride are produced. Serious deposition of carbon on the walls of the reactor tube occur and such carbon deposits catalyze the reaction and increase the velocity to a point where violent combustion takes place at the point of chlorine injection. Carbon deposits also plug the reactor tube, preventing further operation.

By carefully controlling the chlorine addition, the temperature of the reaction, and by carrying out the reaction in a turbulent bed of inert solid to permit rapid heat transfer, a commercially feasible process for the chlorination of methane-hydrogen mixtures to produce principally carbon tetrachloride, chloroform and hydrogen chloride has been made possible.

While in the chlorination of methane the prior art indicates that the use of catalysts is generally preferred, it has been found that, in the process of the present invention, the reaction should be carried out in the absence of a catalyst. While it might be expected that the extremely large surface presented by the turbulent sand bed might effect a catalysis of the reaction, it has been found by measurement of the rate of the disappearance of chlorine in the reactor that this is not the case.

The rate of reaction of a methane mixture containing 40% hydrogen with chlorine may be expressed in terms of a specific reaction rate constant defined by the following equation:

$$K = \frac{2.303}{t(a-.28b)} \log \frac{b(a-.28x)}{a(b-x)}$$

where $t$ is the time in seconds, $a$ is the initial concentration of chlorinatable material, $b$ is the initial concentration of chlorine and $x$ is the amount of chlorine reacting. The specific reaction rate constants determined in the turbulent bed reactor are actually lower than the corresponding values obtained in an empty tube. For example, at 350° C. the value of K for the turbulent bed was 0.52 while for an empty tube at the same temperature K was 0.93.

The process of the present invention is particularly applicable to the chlorination of methane-hydrogen mixtures containing from 20% to 60% by volume of hydrogen to produce principally carbon tetrachloride and chloroform from the methane present in the mixture and the incidental formation of hydrogen chloride. In carrying out the chlorination of this mixture, the overall chlorine to methane-hydrogen ratio may be in the range of 25% to 100% of the maximum stoichiometric ratio. I prefer to use feed ratios which are at least 60% of the maximum stoichiometric ratio for the given methane-hydrogen mixture. With 20% hydrogen in the methane-hydrogen mixture, the maximum ratio is 3.4:1, while with 60% hydrogen in the mixture the maximum ratio is 2.3:1.

The temperatures employed may vary from 325° to 450° C., but the preferred temperature will depend on the manner of portioning the chlorine feed. It is preferable to control the temperature so that for any particular concentration of chlorine in the reactant gases the temperature does not exceed the ignition threshold temperature specified above. In the three-stage reactor, as illustrated in Figure 1 of the drawing, the temperature range will be from 325° to 425° C., while in the one-stage reactor slightly higher temperatures such as 350° to 450° C. may be preferred.

While sand has been employed in the above examples as the inert solid because it is readily available and gives good results, it is of course understood that other inert solids may be employed provided they have sufficiently high heat capacity and do not exert a catalytic effect in the reaction. Glowed wood charcoal has been found to operate satisfactorily, but activated carbon and silica gel because of their catalytic influence tend to increase the formation of carbon and also increase the production of high boiling side reaction products, resulting in a considerable loss in yield of the desired chloromethanes.

The reactors may be constructed of any material which will resist the attack of hot hydrogen chloride or chlorine, such as glass or stainless steel. Acid-resistant brick or nickel may also be employed.

When reactors of small diameter, up to about 6 inches, are used it is possible to radiate the total heat of reaction to the surrounding atmosphere. In fact, this radiation loss may be so great that a net heat input to the reactor is required. As the diameter of the reactor increases above about 6 inches, radiation alone may no longer be able to dissipate the heat of the reaction. It then becomes necessary to remove the heat of the reaction by any of the various means known to those skilled in the art, such as, for example, by jacketing the reactor with a cooling medium or by placing cooling coils within the turbulent bed. The reactor can also be cooled by continuously removing a portion of the solids from the bottom of the reactor and causing these solids to be transported through an external heat exchanger, utilizing the feed or exit gases for transporting these solids. Such expedients are well known in the art of fluid catalytic cracking of hydrocarbons.

I claim:

1. A process for chlorinating a mixture of methane and hydrogen, which mixture contains from 20% to 60% of hydrogen, to produce predominantly chloroform, carbon tetrachloride and hydrogen chloride, which comprises passing the chlorine and methane-hydrogen gas mixture through a bed of finely divided inert solids under conditions whereby the passage of the gases therethrough maintains the inert solids in a fluidized turbulent condition, the temperature of the turbulent bed being maintained at from 325° to 450° C. and the chlorine being added in increments in such amounts that the chlorine concentration at any particular point in the reaction bed does not exceed the ignition threshold concentration for the given bed temperature, the overall ratio of chlorine to methane-hydrogen employed in the reaction being between 60% and 100% of the maximum stoichiometric ratio.

2. A process for chlorinating a mixture of methane and hydrogen, which mixture contains from 20% to 60% of hydrogen, to produce predominantly chloroform, carbon tetrachloride and hydrogen chloride, which comprises mixing a portion of the chlorine with the methane-hydrogen mixture at a temperature below 200° C. in such amounts that the chlorine concentration is not greater than 50% by volume of the total gas mixture, passing this gas mixture through a bed of finely divided inert solids under conditions whereby the passage of the gases therethrough maintains the inert solids in a fluidized turbulent condition, the gas mixture being passed into the bed of inert solids within at least within 5 seconds after mixing, the temperature of the bed being maintained at a temperature not higher than the ignition threshold temperature corresponding to the inlet chlorine concentration and within a range of 350° to 370° C., partially cooling the product gas from this reaction to below 200° C., mixing additional chlorine with the product gas to a chlorine concentration not exceeding 50% and introducing the mixture into a second turbulent bed of inert solids maintained at a temperature not higher than the ignition threshold temperature and within a range of 350° to 370° C., partially cooling the product gases to below 200° C., and similarly admixing and reacting a third and last portion of chlorine in such amounts that the overall chlorine to methane-hydrogen ratio is at least 60% of the maximum stoichiometric ratio.

3. A process for chlorinating a mixture of methane and hydrogen, which mixture contains from 20% to 60% of hydrogen, to produce predominantly chloroform, carbon tetrachloride and hydrogen chloride in a single turbulent bed of inert solids, which comprises mixing the chlorine with the methane-hydrogen at reaction temperatures within the turbulent bed, the bed being maintained in turbulent condition by the passage of the gases therethrough, the overall feed ratio of the chlorine to methane-hydrogen in the gas mixture being at least 60% of the theoretical maximum stoichiometric ratio for the methane-hydrogen mixture employed, adding the chlorine to the gas mixture at at least 3 levels within the turbulent bed, such amounts of chlorine being added at each level so that the chlorine concentration in the reacting gases at any given point does not exceed the ignition threshold concentration for the temperature of the turbulent bed and within the range of from 350° to 450° C.

4. The process of claim 1 wherein the inert solid employed is silica sand.

5. The process of claim 1 wherein the inert solid employed is silica sand previously treated with aqueous hydrochloric acid.

PAUL R. JOHNSON.

REFERENCES CITED

The following references are of record in the file of this patent:

UNITED STATES PATENTS

| Number | Name | Date |
|---|---|---|
| 2,373,008 | Becker | Apr. 3, 1945 |
| 2,429,963 | Reitlinger | Oct. 28, 1947 |
| 2,434,537 | Barr et al. | Sept. 6, 1949 |

FOREIGN PATENTS

| Number | Country | Date |
|---|---|---|
| 222,919 | Germany | June 9, 1910 |
| 513,947 | Great Britain | Oct. 26, 1939 |